United States Patent [19]

Barnes et al.

[11] 4,414,874
[45] Nov. 15, 1983

[54] FABRIC CUTTING

[75] Inventors: Thomas E. Barnes, Bloomington, Ind.; Clifford A. Landsness, Akron, Ohio

[73] Assignee: The B. F. Goodrich Company, New York, N.Y.

[21] Appl. No.: 295,356

[22] Filed: Aug. 24, 1981

[51] Int. Cl.³ .......................... B26D 1/18; B26D 1/20
[52] U.S. Cl. ........................................ 83/488; 83/508; 83/675
[58] Field of Search .................... 83/508, 486, 486.1, 83/488, 676, 675, 349, 331-333, 500-502

[56] References Cited

U.S. PATENT DOCUMENTS

| Re. 29,268 | 6/1977 | Kuts | 83/508 X |
|---|---|---|---|
| 371,961 | 10/1887 | Mason | 83/508 X |
| 2,219,485 | 10/1940 | Neuwirth | 83/508 X |
| 3,207,019 | 9/1965 | Vanzo et al. | 83/508 X |
| 3,312,135 | 4/1967 | Mraz | 83/675 |
| 3,813,981 | 6/1974 | Faltin | 83/500 |
| 4,170,913 | 10/1979 | Hoddinott et al. | 83/500 X |
| 4,274,319 | 6/1981 | Frye et al. | 83/500 X |

Primary Examiner—Frank T. Yost
Attorney, Agent, or Firm—Joseph Januszkiewicz

[57] ABSTRACT

A cutter apparatus for cutting of rubberized fabric material having high strength material embedded therein, wherein a carriage is reciprocated on a support frame, which frame may be adjusted angularly to provide a bias angle of cut. A cutter support is mounted on the carriage for movement therewith. Such cutter support journals for rotation a shaft that supports on one end a rotating cutter. The cutter has a plurality of lobes that taper providing a plurality of linear cutting edges. The cutter cooperates with a linear cutting edge on an anvil that also tapers thereby facilitating the shearing of the fabric material. A guide is mounted on the frame over which the fabric material travels and under which a conveyor belt move, which belt transports the fabric material. Upon completion of a cut, the cutter, anvil and its supporting framework is pivoted out of the way to permit the indexing of the material and the return of the cutter and anvil during such indexing to the starting position in preparation for a succeeding cutting operation.

5 Claims, 7 Drawing Figures

FIG. 1
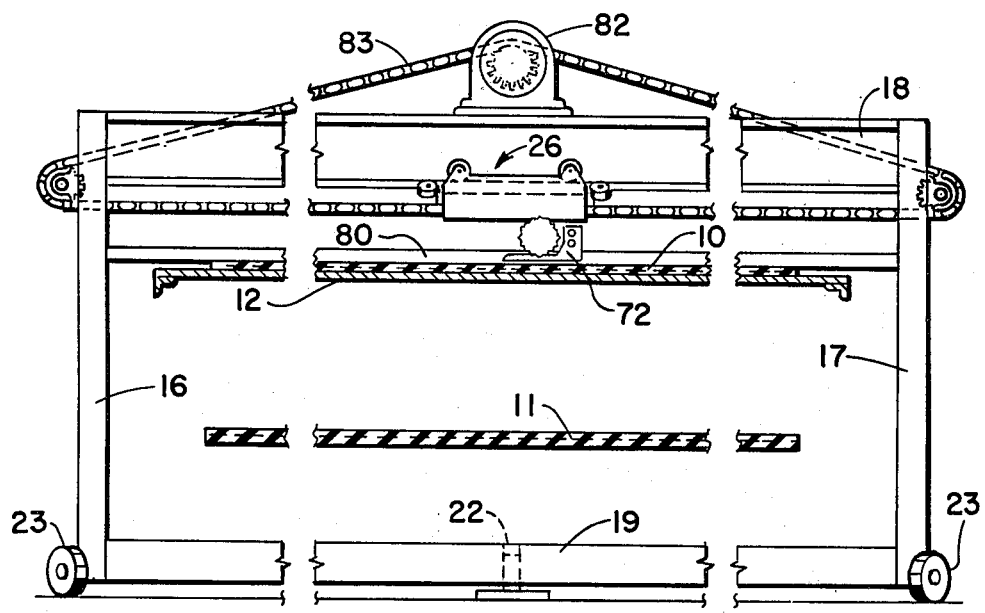
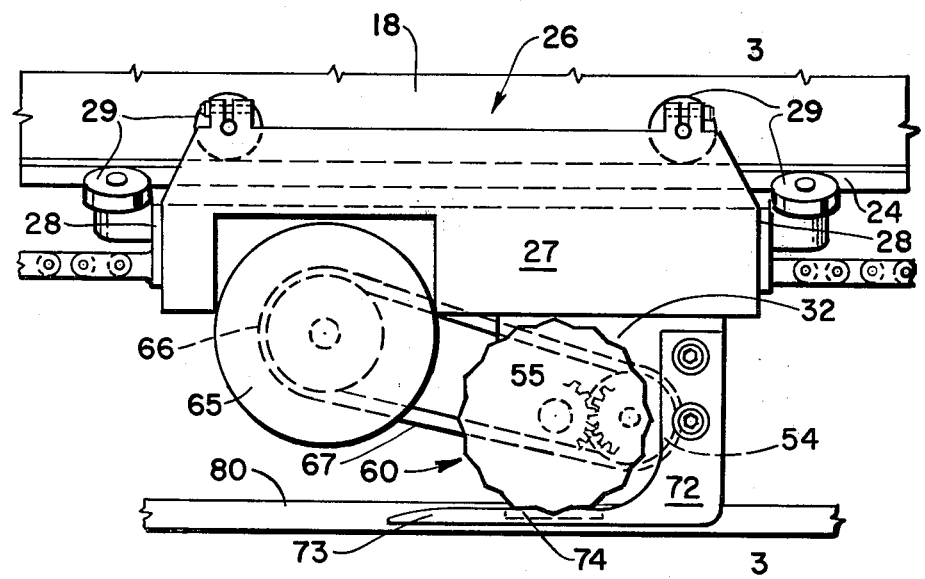
FIG. 2

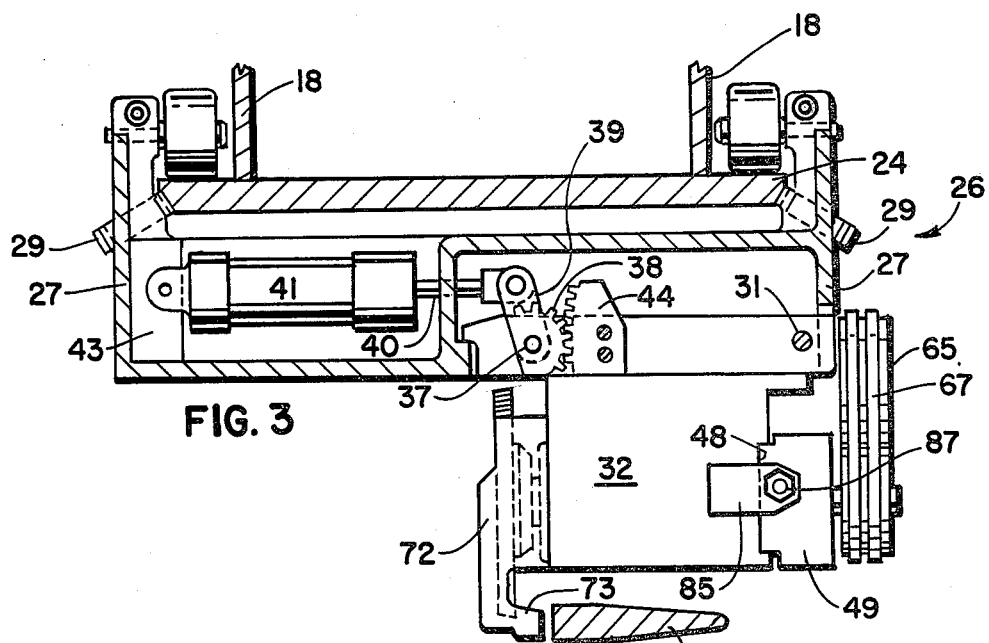
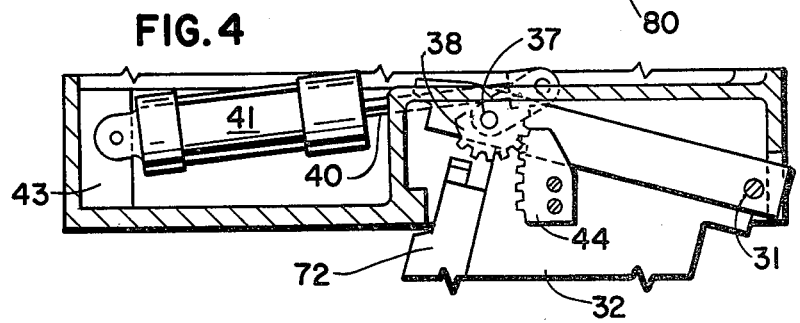
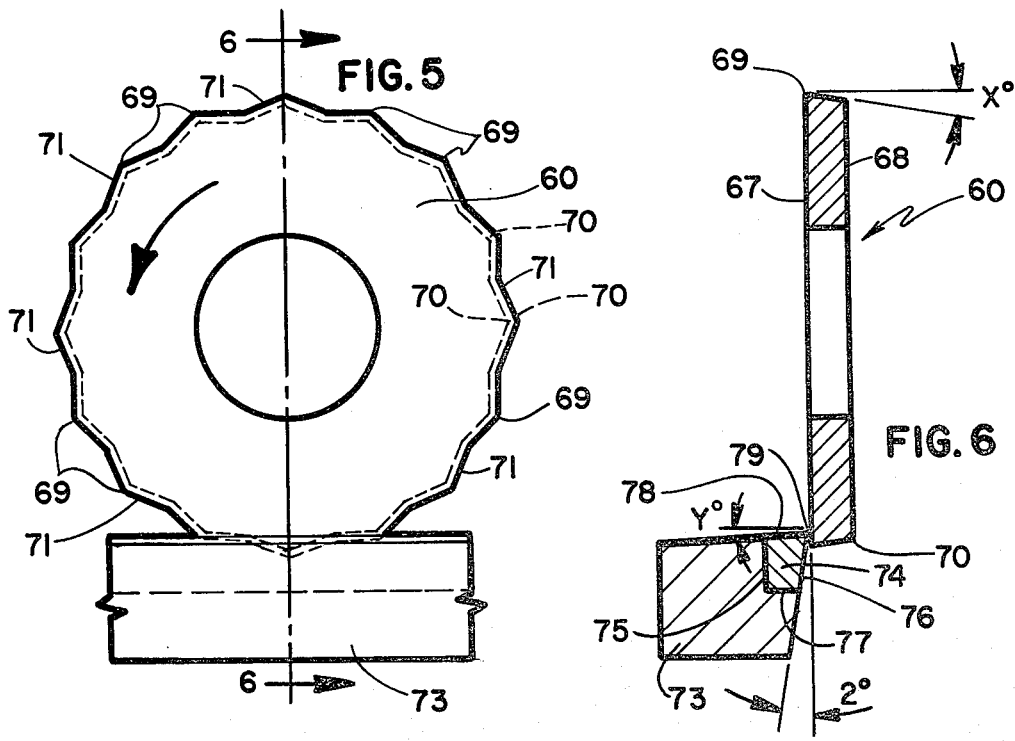

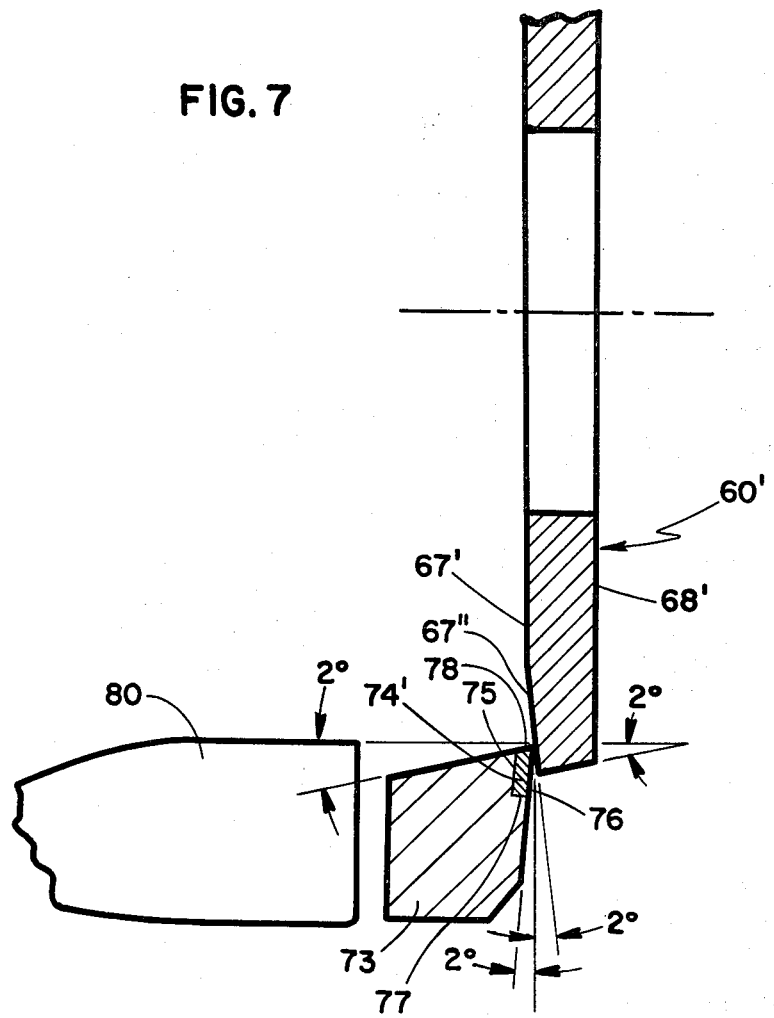

FABRIC CUTTING

BACKGROUND OF THE INVENTION

This invention relates to pneumatic tire manufacture and more particularly to a cutting apparatus for cutting ply stock material which is employed in the construction and manufacture of pneumatic tires.

In the manufacture of pneumatic tires, one of the principal materials used to build the tire carcass is a thin sheet of uncured rubberlike material known as a fabric, building ply or ply stock. In the manufacture of such ply stock, parallel cords of fabric, wire cord or high strength cord such as Kevlar cord are passed through a pair of rolls in cooperation with calendering rolls which work and calender unvulcanized rubber onto the parallel cords as they pass through the pinch rolls to form a continuous sheet of material with the parallel strands of cord embedded therein and running in a direction that is parallel to the longitudinal centerline of the material. Thereafter, such sheet material is cut into sections of fabric which sections may have the cords at a bias angle relative to the cut edge. The cut sections are then spliced together to make a building ply or ply stock with cords therein located at a desired angle relative to the longitudinal centerline of the ply stock. Such stock or ply stock may also be at a ninety degree angle to the longitudinal centerline of the ply stock formed; however, for purpose of this description and example, the invention will be described wherein the cords are at some small acute angle relative to the longitudinal centerline of the ply stock. Layers of ply stock are applied to a tire building drum in such a manner that cord members of overlapping plies crisscross with respect to the cord members above or below. The tire beads are then set against the ends of the ply stock and the plies are turned thereover. Additional plies, chafer strips, sidewall strips, breakers, overhead belts and a tread ply may be applied in varying orders, and stitched thereto. Such carcass is substantially a cylindrical band. The angle measured between the cords and the circumferential line around the crown of the tire determine the bias angle of the plies. In the case of conventional bias ply pneumatic tires, this may be approximately sixty degrees. However, this apparatus can cut fabric material with strands of steel or Kevlar cord therein which make a small acute angle with the circumferential centerline of the tire. After the removal of such green tire, the tire is given a toroidal shape on a second step machine and then vulcanized. The shaping on the second step machine changes the bias angle. The above description contemplates the use of inextensible or nonextensible cord materials such as nylon, Kevlar cord and wire. In the processing of ply stock containing such inextensible cord, processing is difficult because of the tremendous strength of the material, which cutting is particularly compounded by the very low bias angle cutting on such stock wherein the cutters tend to fray the ends of the Kevlar cord or wire, which action interferes with the splice to be effected. The use of the present apparatus permits the cutting of stock which has a zero bias angle, as where the cords are ninety degree relative to circumferential center line around the crown of the tire.

In bias cutting rubberized fabric, the conventional way of cutting is to use a pair of steel fingers that lift the fabric away from the conveyor belt on which it travels, so that a rapidly rotating cutter disk is above the fingers but is cooperative therewith to cut the fabric. The application of this conventional apparatus to cut rubberized Kevlar and steel cord fabric including fabric for radial tires is difficult and unsatisfactory. The rotating cutter of the present invention is mounted on a carriage and moveable therewith. The cutter is cooperative with an anvil also moveable with the carriage. An insert on the anvil has a tapered cutting edge that cooperates with a cutter having a plurality of linear cutting edges, whose edges taper in a direction that insures a positive shearing action. Upon the completion of a cut across the fabric material, the cutter and anvil are pivoted out of the way so that the cutter and anvil can be returned to their starting position as the fabric material is advanced or indexed in preparation for the succeeding cut.

SUMMARY OF THE INVENTION

The present invention contemplates an apparatus that utilizes a carriage which is mounted on a support frame for reciprocal movement on a guideway. The support frame may be adjusted for the bias angle to be cut, or it may be adjusted for zero bias angle. A cutter support member carrying a cutter and its cooperative anvil is mounted on the carriage for movement therewith. The anvil is supported by the cutter support member in its reciprocal movement. Means are provided to pivot the cutter and the cutter support member along with the anvil out of the way so that the cutter and anvil can be returned to the original starting position while the fabric material to be cut is indexed in preparation for the next cut. The rotating circular cutter has a plurality of circumferentially spaced linear cutting edges that cooperate with a linear cutting edge of the anvil to provide a shearing action. The cutting edge of the anvil and rotating cutter taper in opposite directions.

BRIEF DESCRIPTION OF THE DRAWINGS

FIG. 1 is a front elevational view of a bias cutting apparatus with a portion of the conveyor shown.

FIG. 2 is an enlarged elevational view of the carriage, cutter support, anvil and a portion of the guide bar.

FIG. 3 is a cross-sectional view of the carriage and cutting means taken along lines 3—3 of FIG. 2.

FIG. 4 is a fragmentary cross-sectional view of a portion of the carriage and cutter support showing the cutting support elevated.

FIG. 5 is a side elevational view of the rotary cutter and a portion of the anvil.

FIG. 6 is an enlarged cross-sectional view of the cutter and anvil taken along lines 6—6 of FIG. 5.

FIG. 7 is an enlarged cross-sectional view of a modified cutter and anvil.

DETAILED DESCRIPTION

Referring to the drawings wherein like reference numerals designate like or corresponding parts throughout the several views, there is shown in FIG. 1 an endless conveyor belt that is suitably supported at spaced ends thereof by suitable rollers driven in a manner old and well known in the art. The conveyor belt has an upper conveying run 10 and a lower return run 11. Suitable guide and support means are provided to guide the belt in its travel, including an upper plate 12 to support upper run 10. Supporting framework shown generally in FIG. 1 includes a pair of spaced upwardly extending support members 16 and 17 with suitable supports including an upper cross support or I-beam 18 and a lower cross support 19. Lower support 19 has a pivot mounting 22 at its intermediate lower portion suitably journaled in the floor of the installation, about which the support framework can be pivotally adjusted. A plurality of spaced rollers 23 are suitably mounted on respective lower end portions of the supporting framework to facilitate the angular adjustment of the supporting frame and the bias cutting apparatus to be described. Cross support members (FIGS. 1 and 3) 18 extend across the entire width of the bias cutting apparatus and support a guideway or guideway member 24 having a plurality of ways thereon. Mounted for reciprocal movement on guideway 24 is a carriage means 26 which includes side plates 27—27 and end plates 28—28 (FIG. 2). Suitably journaled on carriage means 26 are a plurality of rollera 29 which rollingly engage the ways on guideway 24 to maintain carriage means 26 thereon and guide the reciprocal movement of the carriage means 26. Journaled on the lower one end portion of end plates 28—28 of carriage means 26 is a rod or shaft 31 for pivotally supporting a cutter support member 32. Cutter support member 32 has a pair of bosses integral therewith each having aligned bores in which is journaled a shaft 37. Shaft 37 has a pair of spur gears 38 (only one shown) suitably keyed to the respective end portion thereof. Shaft 37 supports a clevis 39 for pivotal attachment to the rod end of piston rod 40 of a pneumatic cylinder 41. The head end of pneumatic cylinder 41 is pivotally attached to a bracket means 43 which is part of the side plate 27 of carriage means 26. The spur gears 38 meshingly engage stationary gear segments 44 (only one shown) that are rigidly secured to the respective enf plates 28—28 of carriage means 26. Upon actuation of the head end of cylinder 41, piston rod 40 is extended therefrom to a position shown in FIG. 4 whereby the spur gears 38 rotate clockwise as shown in FIG. 3 pivoting the cutter support member 32 in a clockwise direction (as viewed in FIG. 3) about shaft 31 for a purpose to be described.

The lower portion of cutter support member 32 is centrally recessed to provide guideways 48 which support an adjustable block 49. A motor 65 suitably secured to carriage means 26 has its output shaft connected to a sheave 66 which is in alignment with a sheave 54. Sheave 54 has it output connected via suitable gears to drive shaft 55. A V-belt 67 is trained about sheaves 66 and 54, to provide the transfer of power from motor 65 to shaft 55 on which a cutter 60 is mounted.

Cutter 60 has a pair of spaced parallel sides 67-68 that lie in vertical planar surfaces. The outer perimeter of the one side 67 defines a first convex polygon with a plurality of apexes 69. The included angle of all apexes 69 are equal. The outer perimeter of the other side 68 of cutter 60 defines a second convex polygon with a plurality of apexes 70. The included angle of all apexes 70 are equal. The outer peripheral surfaces between the first convex polygon and the second convex polygon is a series of flat surfaces that taper downwardly and inwardly (from the first polygon to the second polygon) towards the axis of rotation of cutter 60. As viewed in side elevation, the taper of such surfaces on cutter 60 is an angle X that will be in the range between 1 and 6 degrees. Preferably, this range will be 2 to 5 degrees. The respective edges adjacent the outer perimeter of convex polygon of the one side 67 defines a series of linear cutting edges 71.

Suitably secured to the cutter support member 32 is an L-shaped bracket member 72 with its lower end portion having a laterally horizontally extending anvil 73. Anvil 73 is suitably recessed to receive a carbide cutter insert 74 that is located adjacent to the lower portion of rotatable cutter 60. In cross-sectional view, insert cutter 74 has a pair of surfaces 75 and 77 at right angles to each other to seat on the recess in anvil 73. Cutter insert 74 has an upper surface 78 that tapers downwardly away from a horizontal plane making an angle Y with the horizontal plane. The top of the anvil also tapers at the same taper as the angle Y and forms a planar suface therewith. The forwardly disposed surface 76 of the cutter insert 74 tapers downwardly and away from the vertical at approximately 2 degrees therefrom. Such taper may be from 1 to 5 degrees. The upper surface 78 of cutter insert 74 makes an acute angle with the front or forwardly disposed surface 76. Angle Y will be in a range between 1 to 6 degrees. Preferably angle Y will be greater than angle X by a range of 1 to 5 degrees. It should be noted that the taper on cutting insert 74 is in an opposite direction to that taper in cutter 60, thus the adjoining cooperative cutting edges taper away from each other to provide a linear co-action as they shear the cords in the ply stock.

Cutter support member 32 has bracket means 85 suitably secured thereto, which bracket means 85 has bores therein threadedly engaged by set screws 87. The respective end portions of set screws 87 abuttingly engage the block 49 to adjust its lateral position on the guideways 48 in the cutter support member 32. Such block 49 may carry self-aligning bearing to permit the adjustment of block 49 by set screws 87. The anvil 73 is moved paralled to the edge of a guide bar 80 over which the fabric material moves while the upper conveying run 10 moves under the guide bar 80.

The intermediate upper portion of I-beam 18, as shown in FIG. 1, supports a variable speed motor 82 having its output connected to a sprocket chain 83 which in turn is connected to carriage 26 and controls the reciprocation of the carriage on the guideway member 24 by suitable controls and limit switches old and well-known in the art.

A modification to the cutter insert and rotary cutter is shown in FIG. 7 wherein the rotary cutter 60' has the same design and configuration as that described in the first embodiment of FIGS. 5 and 6. Such cutter 60' has plural apexes 69 and parallel side surfaces 67' and 68' with their polygon shapes. The outer edge of the first convex polygon of side surface 67' is of greater radius than the outer edges of the second convex polygon of side surface 68' and with the series of flat surfaces tapering from the outer edge of the first convex polygon towards the outer edge of the second convex polygon. The difference in structure of cutter 60' is that the outer face 67'' of the side surface 67' tapers at approximately 2 degrees from the vertical (which is on the side adjacent to the cutter insert 74 and anvil 73). Such taper may be from 1 to 5 degrees. The cutter insert 74 and anvil 73 are identical to that of the first embodiment although the respective surfaces 75 and 77 can be parallel to the outer surfaces 76 and 78 respectively.

In the operation of the apparatus described, the fabric material is advanced over the guide bar 80 by the upper conveying run 10 and, after sufficient material has advanced, the conveyor is stopped in preparation for the cutting of the fabric. Upon stopping of the conveyor belt, motor 82 is energized which thereby moves carriage 26 across guide bar 80 while cutter 60 is rotated at a high speed through the output of motor 65 which transfers its output to the V-belt 67 and thence to shaft 55. The respective cutting edges 71 of cutter 60 lie in a plane that is substantially coplanar to the cutting edge of anvil 73 as seen in FIG. 6. The cooperative cutting edges of these cutter perform a snipping or shearing action which is a downward movement of the linear cutting edge across the fabric such that the Kevlar or steel cords embedded in the fabric are cut effectively without fraying the ends thereof as the carriage 26 is moved linearly across the fabric to be cut. Upon completion of the cut, motor 82 is denergized and the head end of cylinder 41 is pressurized, which action rotates the shaft 37 and spur gears 38 which mesh with stationary gear segments 44. Such action causes the gears 38 to roll up the gear segment 44, pivoting the cutter support 32, along with the cutter 60 and anvil 73 out away from the guide bar 80 about shaft 31 to permit the advancement of the fabric material as the carriage 26 is returned to its initial starting position by motor 82 through suitably limit switches and controls old and well known in the art. Upon return of the carriage to its initial starting position, the rod end of cylinder 41 is pressurized and returns the cutter support member 32 and anvil 73 to the lowered position in preparation for the next succeeding cut.

Various modifications are contemplated and may obviously be resorted to by those skilled in the art without departing from the described invention, as hereinafter defined by the apended claims, as only a preferred embodiment thereof has been disclosed.

We claim:

1. A cutting apparatus for cutting rubberized fabric with cords disposed therein comprising a support frame, a carriage mounted on said support frame for reciprocal movement, drive means connected to said carriage for reciprocating said carriage, a cutter support member mounted on said carriage, a cutter means journaled on said cutter support member for rotation thereon, power means mounted on said carriage operatively connected to said cutter means for continuously rotating said cutter means, said cutter means having a pair of said surfaces, one of said side surfaces having an outer perimeter defining a first convex polygon with a plurality of apexes and a plurality of linear cutting edges, the other of said side surfaces having an outer perimeter defining a second convex polygon, the outer circumferential surface of said cutter means between said polygons being a plurality of flat surfaces that taper inwardly from said first convex polygon towards said second convex polygon, anvil means mounted on said cutter support member for movement therewith, said anvil means having a linear cutting edge cooperative with successive linear cutting edges of said first convex polygon presented to said anvil means by rotation of said cutter means, said linear cutting edge of said anvil means being defined by the intersection of the edges of an anvil upper surface and an anvil forwardly disposed surface, said anvil upper surface and said anvil forwardly disposed surface being tapered away from their intersection such that said surfaces subtend an acute angle.

2. A cutting apparatus for cutting rubberized fabric as set forth in claim 1 wherein said respective tapered outer circumferential flat surfaces of said cutter means make an acute angle of between 2 to 5 degrees with planes normal to said one of said side surfaces and containing said respective linear cutting edges of said cutter means.

3. A cutting apparatus for cutting rubberized fabric as set forth in claim 2 wherein the horizontal plane containing said linear cutting edge of said anvil makes an acute angle with a plane that contains the upper surface of said anvil of between about 1° to 6°.

4. A cutting apparatus as set forth in claim 1 wherein the outer portion of said one of said side surfaces of said cutter tapers toward the other of said surfaces thereof.

5. A cutting apparatus as set forth in claim 4 wherein said taper of said outer portion of said one of said side surfaces relative to the vertical is in a range of 1 to 5 degrees.

* * * * *